(12) United States Patent
Scheck et al.

(10) Patent No.: US 6,702,089 B1
(45) Date of Patent: Mar. 9, 2004

(54) ADJUSTMENT DEVICE FOR A CLUTCH WITH LOAD MOMENT LOCK

(75) Inventors: Georg Scheck, Weitramsdorf (DE); Peter Schumann, Untersiemau (DE)

(73) Assignee: Brose Fahrzeugteil GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/129,292

(22) PCT Filed: Nov. 3, 2000

(86) PCT No.: PCT/DE00/03935

§ 371 (c)(1),
(2), (4) Date: May 3, 2002

(87) PCT Pub. No.: WO01/32464

PCT Pub. Date: May 10, 2001

(30) Foreign Application Priority Data

Nov. 4, 1999 (DE) .......................................... 199 54 232

(51) Int. Cl.[7] ............................. B60N 2/44; F16D 67/00
(52) U.S. Cl. ......................................... 192/223; 192/15
(58) Field of Search ........................... 192/223, 15, 19; 188/134; 74/531

(56) References Cited

U.S. PATENT DOCUMENTS

| 3,414,095 | A | * | 12/1968 | Kalns | .......................... | 192/223 |
| 3,497,044 | A | * | 2/1970 | Kalns | .......................... | 192/223 |
| 4,614,257 | A | | 9/1986 | Harada et al. | | |

FOREIGN PATENT DOCUMENTS

DE 41 20 617 A1 12/1992
EP 1 059 195 A2 12/2000

OTHER PUBLICATIONS

International Search Report of PCT/DE00/03935, dated Apr. 5, 2001.
International Preliminary Examination Report of PCT/DE00/03935, dated Nov. 14, 2001.
English translation of International Preliminary Examination Report for corresponding International Application PCT/DE00/03935.

* cited by examiner

Primary Examiner—Rodney H. Bonck
(74) Attorney, Agent, or Firm—Christie, Parker & Hale, LLP

(57) ABSTRACT

The invention relates to an adjustment device for producing a rotational movement that comprises an output element (3) that can be adjusted at an angle by actuating a drive element (2). The adjustment device further comprises a load moment lock (1) interposed between the drive and the output element (2, 3) that frictionally blocks a rotational movement initiated at the output element side and that transmits a rotational movement initiated at the drive element side to the output element (3). Said load moment lock (1) further comprises locking elements (4, 4') that are disposed in a cylindrical adjustment housing (10). Upon the effect of a play-compensating device (5) that is at least partially interposed between opposite adjusting surfaces (41, 41') of the locking elements (4, 4') and that compensates the rotational angle play between the drive element (2), the output element (3) and the load moment lock (1), the clamping surfaces (43, 43', 43", 43''') are forced apart with such a force that they rest against the adjustment housing (10) with a predetermined pre-load. The adjustment device is provided with a play-compensating device (5) that for both directions of rotation radially.

7 Claims, 3 Drawing Sheets

ADJUSTMENT DEVICE FOR A CLUTCH WITH LOAD MOMENT LOCK

CROSS-REFERENCE TO RELATED APPLICATION

This application claims priority of International application number PCT/DE00/03935, filed Nov. 3, 2000, which in turn claims priority of German application number 199 54 232.5, filed Nov. 4, 1999.

BACKGROUND

The invention relates to an adjustment device for a clutch with a load moment lock.

An adjustment device with a load moment lock is known from DE 41 20 617 C2 through which torque on the drive side is transferred in both directions to an output element whilst torque on the output side is blocked in both directions by the load moment lock and the force is directed into an adjustment housing and is therefore not transferred to the drive element.

Torque on the drive side is transferred between the drive element and the load moment lock by means of elements which engage in each other with keyed connection. Since the position of the locking elements of the load moment lock changes through tolerance and wear as a result of high surface pressure, for the functional reliability of the known adjustment device it is necessary to incorporate a large amount of play so that rotational angle play is present between the interengaging elements conditional on the function without which a stepped transfer or change of direction of the torque on the drive side is not possible. A minimum rotational angle play must also therefore be present between the interengaging elements of the drive element and load moment lock in order to prevent any wear and to permit a certain elastic deformation.

However too much rotational angle play, particularly with a stepped transfer of the torque on the drive side, becomes unacceptably noticeable since the rotational angle play causes a correspondingly large idling path or idling stroke of the drive element. Moreover when reversing movement too much rotational angle play can lead to troublesome reverse play and to inaccurate handling.

The known adjustment device has a relatively larger reverse play in the brake unit conditioned by tolerances in the component parts. In order to restrict this it is necessary to carry out production accurately within a narrow tolerance band. The assembly of the individual component parts which are provided with low tolerances is expensive since the component parts which are to be connected together have to be positioned precisely relative to each other.

In order to minimize the rotational angle play between a drive element, an output element and a load moment lock and to ensure a secure force or torque transfer without any additional adjustment of the rotational angle play during assembly or re-adjustment of the rotational angle play after longer use, an adjustment device is proposed in the prior patent application 199 26 994.7 wherein between the drive element and the load moment lock or between the output element and the load moment lock there is a play compensating device which compensates the rotational angle play between the drive element, the output element and the load moment lock and with which the functionally conditioned rotational angle play between the drive element and the load moment lock or the load moment lock and the output element is automatically set and adjusted respectively.

To this end the load moment lock has in a cylindrical adjustment housing two locking elements arranged in pairs in two planes one above the other wherein the clamping faces through the action of the play compensating device bear against the adjustment housing with a predetermined pretension in that the play compensating device is arranged at least in part between the opposing expanding faces of the pairs of locking elements and forces the pairs of locking elements apart. The torque introduced on the output side increases the contact pressure of the clamping faces and thus of the pairs of locking elements against the adjustment housing.

The play compensating device furthermore serves to ensure the locking elements bear against the adjustment housing with the predetermined pretensioning force and to ensure an automatic re-adjustment which becomes necessary through wear on the component parts. It can consist for example of a wedge mounted between the expanding faces of the pairs of locking elements, whereby the wedge faces lie opposite the expanding faces of the pairs of locking elements and the wedge is guided displaceable with a wedge guide with keyed engagement in a slide guide of the drive element and is pretensioned radially by means of a spring so that the wedge faces rest against the expanding faces free of play. Alternatively the play compensating device can be formed as a cylindrical roller or ball or as an eccentric which is mounted rotatable between the expanding faces of the locking elements and is preferably designed as a stepped bolt.

An automatic adjustment of a minimum rotational angle play thereby takes place in both directions of rotation of the adjustment device taking into consideration the tolerances in the component parts and an automatic readjustment takes place to account for any wear on the component parts so that a minimum idling stroke is guaranteed during operation in both directions of rotation and high functional reliability is ensured for the adjustment device taking into account unavoidable wear. The manufacture of the individual component parts is thus considerably more cost-effective, assembling the adjustment device becomes easier and waste is restricted to a minimum.

SUMMARY

The object of the present invention is to provide an adjustment device with optimum rotational angle play between a drive element, an output element and a load moment lock which during assembly requires no adjustment and even after longer use requires no re-adjustment of the rotational angle play and which can be constructed simply and in space-saving manner.

The solution according to the invention provides an adjustment device which ensures optimum rotational angle play between a drive element, an output element and a load moment lock and which requires neither adjustment during assembly nor re-adjustment of the rotational angle play even after longer use. Since the locking elements are only arranged in one plane of the load moment lock the adjustment device can be constructed very easily and in space-saving manner, although there is a change-over play when changing over from one adjustment direction into the other.

Preferably the play compensating device has wedge faces which bear against the output element and/or against the locking elements, and at least one spring which pretensions the play compensating device perpendicularly to the axis of the load moment lock in the sense of reducing the distance between the play compensating device, the output element and the locking elements.

Through the wedge faces in connection with the pretensioning force of the spring the locking element faces are constantly brought to bear against the cylindrical adjustment housing and thus optimum rotational angle play is guaranteed during setting up and even after longer term use of the adjustment device.

In order to avoid any resetting of the locking element surfaces which would break down the contact between the locking element surfaces and the cylindrical adjustment housing after operation of the adjustment device, the wedge faces include such an angle with the axis of symmetry of the load moment lock that the connection is self-locking between the play compensating device on the one hand and the output element and/or the locking elements on the other hand.

The wedge faces can be provided selectively between the play compensating device and the output element and/or between the play compensating device and the locking elements. In a first embodiment of the invention the wedge faces of the play compensating device bear against counter wedge faces of the output element and substantially flat faces of the play compensating device bear against the facing expanding faces of the locking elements or parts of the expanding faces.

The output element can have protrusions or curvatures formed symmetrical with the axis of symmetry of the load moment lock for spot or linear contact with substantially rectilinear or inclined surfaces of the play compensating device.

Correspondingly in a second embodiment of the invention the wedge faces of the play compensating device bear against the protrusions or curvatures of the output element and substantially flat surfaces of the play compensating device bear against the facing expanding faces of the locking elements or parts of the expanding faces.

In a third embodiment of the invention the wedge faces of the play compensating device bear against inclined expanding faces of the locking elements and the substantially rectilinear faces of the play compensating device bear against the protrusions or curvatures of the output element.

A further development of the solution according to the invention is characterised in that the drive element has claws which in the event of torque on the drive side after removal of the frictional contact between the locking elements and the adjustment housing engage with keyed connection in recesses of the output element and entrain the latter in the drive direction.

As an alternative to this the drive element can have recesses which in the event of torque on the drive side after removal of the frictional contact between the locking elements and the adjustment housing bear with keyed engagement against claws of the output element and entrain same in the drive direction.

With both variations after the frictional contact between the locking elements and adjustment housing has been lifted through the action of torque on the drive side a positive locking connection is produced between the drive element and the output element and thus a slip-free connection is established between the drive element and output element.

BRIEF DESCRIPTION OF THE DRAWINGS

The idea on which the invention is based will now be explained in further detail with reference to the embodiments illustrated in the drawings in which.

DETAILED DESCRIPTION

Figure 1:
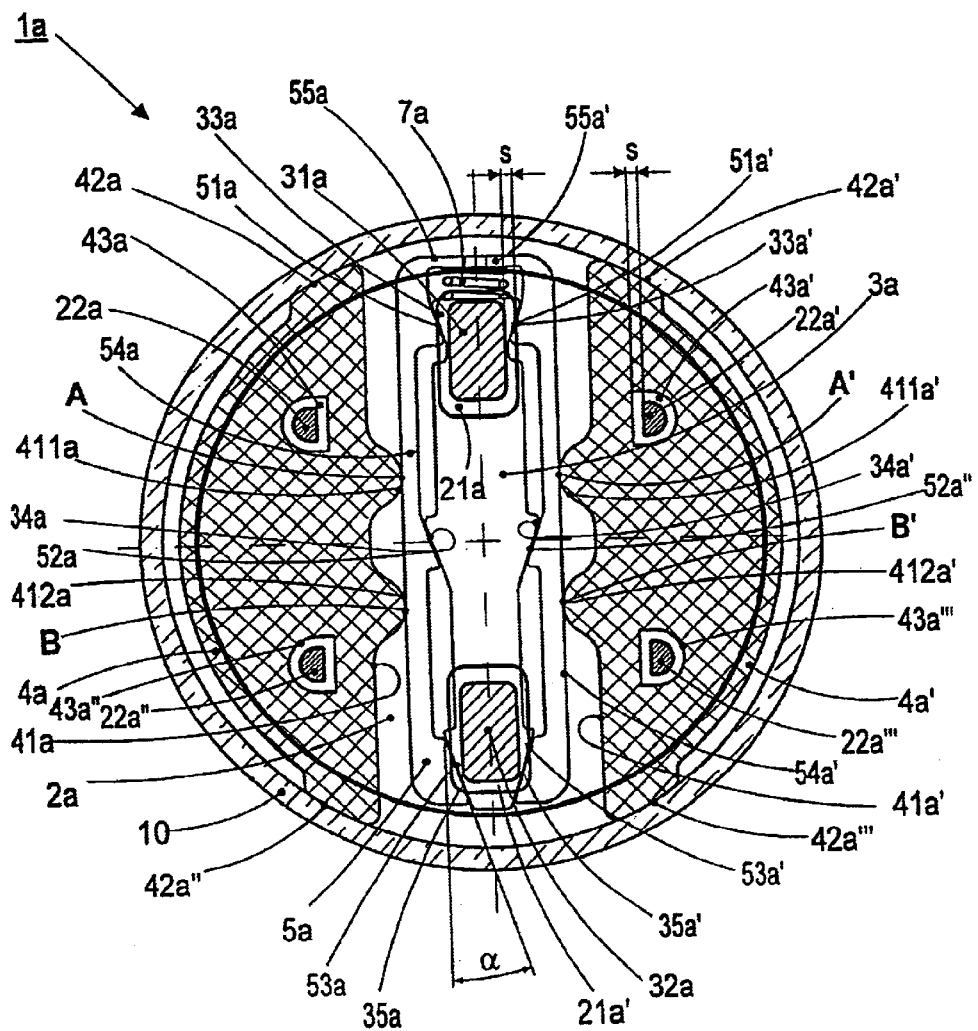
FIG. 1 shows a cross-sectional view through a load moment lock having a pair of locking elements and a device for compensating the play between the drive element, the output element and the load moment lock with adjoining wedge faces of the play compensating device and output element.
Figure 2:
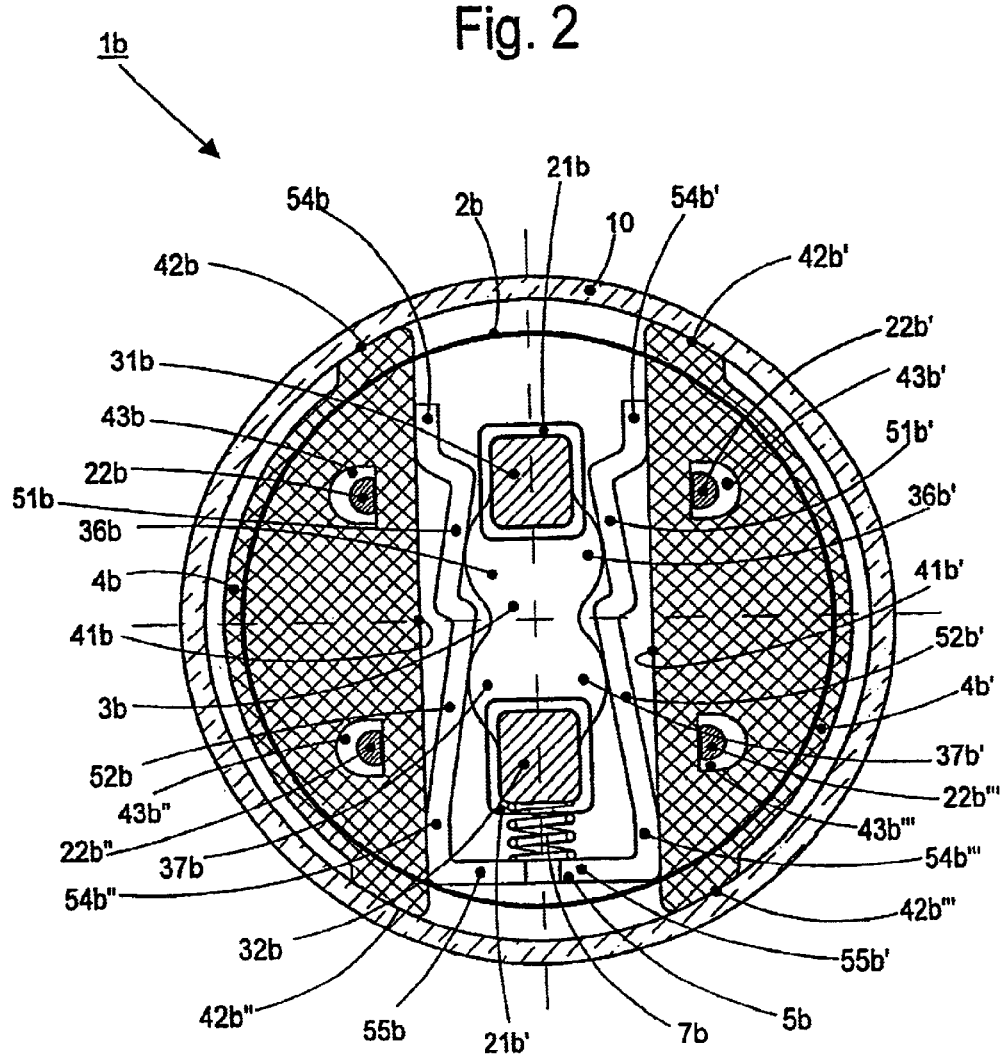
FIG. 2 shows a cross-section through a load moment lock as in FIG. 1 with a play compensating device with wedge faces of the play compensating device bearing against protrusions or curvatures of the output element.
Figure 3:
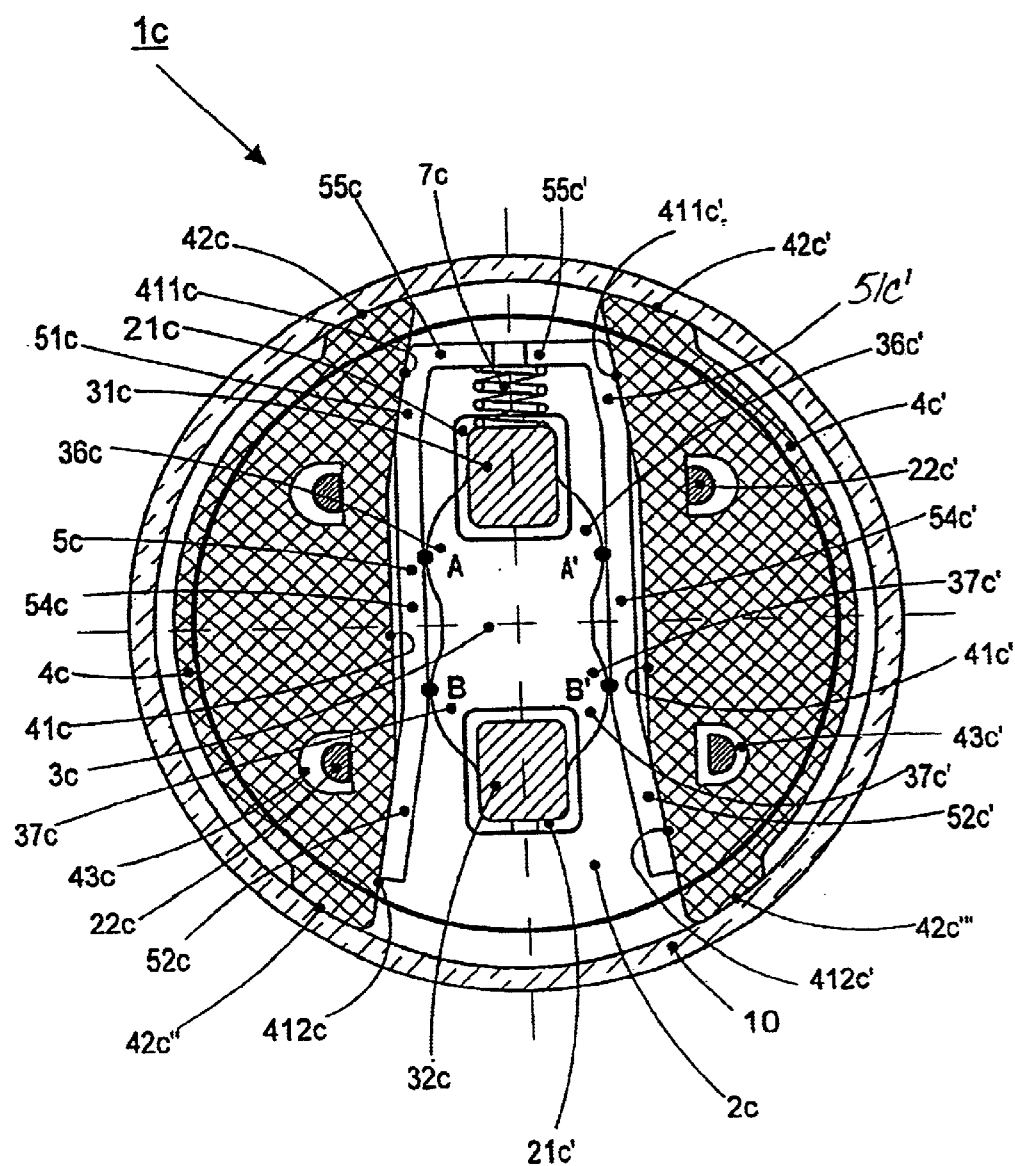
FIG. 3 shows a cross-section through a load moment lock as in FIGS. 1 and 2 with a play compensating device with wedge faces of the play compensating device and the locking elements contacting one another.

The diagrammatic illustrations of the load moment locks in FIGS. 1 to 3 show different embodiments of adjustment devices with a pair of locking elements mounted in a plane of the load moment lock and a device for compensating play between the drive element, the output element and the load moment lock. The reference numerals used coincide in all three figures where they relate to the same component parts or component parts having the same function, and only differ through the addition of a letter (a, b or c) for the different embodiments of the invention.

FIG. 1 shows a section through an adjustment device which operates on both sides and has an adjustment housing 10 (shown in shaded lines) in which the functional parts of a load moment lock 1$a$ having automatic play compensation are mounted. In the adjustment housing there is a driver wheel 2$a$ connected to a drive, for example a drive lever, as a drive element, as well as a claw like output element 3$a$ whose claws 31$a$, 32$a$ engage through window-like recesses 21$a$, 21$a'$ in the driver wheel and have a distance s from the edge of the window-like recesses 21$a$, 21$a'$.

Two circular segment like locking elements 4$a$, 4$a'$ illustrated by crossed hatching rest with their clamping faces 42$a$, 42$a'$, 42$a''$, 42$a'''$ which protrude from the peripheral outer face of the locking elements 4$a$, 4$a'$ against the cylindrical inside face of the adjustment housing 10 and each have two semi-circular recesses 43$a$, 43$a'$, 43$a''$, 43$a'''$ in which engage the drive cams 22$a$, 22$a'$, 22$a''$, 22$a'''$ of the driver wheel 2$a$ (illustrated by a thicker line) at a distance s from the wall of the semi circular like recesses 43$a$, 43$a'$, 43$a''$, 43$a'''$.

Facing the axis of the load moment lock 1$a$, the locking elements 4$a$, 4$a'$ have opposing expanding faces 41$a$, 41$a'$ each with protrusions or curvatures 411$a$, 411$a'$; 412$a$; 412$a'$ formed symmetrical to the axis of symmetry of the load moment lock.

Between the locking elements 4$a$, 4$a'$ and the output element 3$a$ is a play compensating device 5$a$ which lies by means of a spring 7$a$ under pretension between the two locking elements 4$a$, 4$a'$ and has the effect that the semi circular like recesses 43$a$, 43$a$, 43$a''$, 43$a'''$ of the locking elements 4$a$, 4$a'$ rest free of play (FIG. 2) against the drive cams 22$a$, 22$a'$, 22$a''$, 22$a'''$ of the driver wheel 2$a$. The play compensation between the drive element, the output element and the load moment lock is thus established with only one locking element pair in one plane. To see more clearly the play s which exists without the action of the play compensating device 5$a$, FIG. 1 shows the drive cams 22$a$, 22$a'$, 22$a''$, 22$a'''$ of the driver wheel 2$a$ spaced by the play s from the semi circular recesses 43$a$, 43$a'$, 43$a''$, 43$a'''$ of the locking elements 4$a$, 4$a'$. Through the action of the play compensating device 5$a$ this play is eliminated and the drive cams 22$a$, 22$a'$, 22$a''$, 22$a'''$ of the driver wheel 2$a$ lie as shown in FIG. 2 without play against the semi circular recesses 43a, 43a', 43a", 43a'" of the locking elements 4a, 4a'.

For this purpose the play compensating device 5a has several wedge faces 51a, 51a'; 52a, 52a'; 53a, 53a' which rest against the corresponding counter wedge faces 33a, 33a'; 34a, 34a'; 35a, 35a' of the output element 3a. On the side facing the locking elements 4a, 4a' the play compensating device 5a consists of flat or straight surfaces 54a, 54a' which at contact points A, A', B, B' contact the protrusions or curvatures 411a, 411a'; 412a; 412a' of the expanding surfaces 41a, 41a' of the locking elements 4a, 4a'.

The spring 7a serving to pretension the play compensating device 5a is thereby mounted between the angled ends 55a, 55a' of the play compensating device 5a and an end face of the output element 3a so that the wedge faces 51a, 51a'; 52a, 52a'; 53a, 53a' are moved parallel outwards i.e. to the locking elements 4a, 4a' so that the locking elements 4a, 4a' are forced parallel outwards through the contact bearing points A, A', and B, B'.

The angle α between the wedge faces 51a, 51a'; 52a, 52a'; 53a, 53a' of the play compensating device 5a and the counter wedge faces 33a, 33a'; 34a, 34a'; 35a, 35a' of the output element 3a is selected so that the play compensating device 5a does not yield under stress, i.e. is displaced against the action of the spring 7a.

The wedge faces 51a, 51a'; 52a, 52a'; 53a, 53a' and counter wedge faces 33a, 33a'; 34a, 34a'; 35a, 35a' which bear against each other under the action of the play compensating device 5 can be arranged selectively on the play compensating device 5a, on the output element 3a and/or on the locking elements 4a, 4a'. In all cases the locking elements 4a, 4a' move parallel outwards during resetting of the play compensating device 5a so that the play between the drive element 2a, the output element 3a and the load moment lock 1a is eliminated or an elastic contact bearing of the drive cams 22a, 22a', 22a", 22a'" against the recesses 43a, 43a', 43a", 43a'" of the locking elements 4a, 4a' is generated for transferring a drive moment.

The type of play compensation between the drive element 2a, the output element 3a and the load moment lock 1a stems from large wedge paths for small paths of the locking elements 4a, 4a' wherein the wedge angle α is measured so that the play compensating device 5a does not yield under stress and can be displaced against the action of the spring 7a.

When the adjustment device is operated, torque introduced on the drive side through the driver wheel 2a as a result of the circular directed force engagement which is further away from the rotational center leads to a slight rotation of the locking elements 4a, 4a' as a result of the torque transfer from the drive cams 22a, 22a', 22a", 22a'" of the driver wheel 2a to the recesses 43a, 43a', 43a", 43a'" of the locking elements 4a, 4a' and then after overcoming the distance s between the claws 31a, 32a of the output element 3a and the window-like recesses 21a, 21a' of the driver wheel 2a to a positive locking connection between the claws 31a, 32a of the output element 3a and the window like recesses 21a, 21a' of the driver wheel 2a and thus to rotation of the output element 3a.

Torque introduced on the output side through the output element 3a on the other hand, as a result of the more central and radially directed force engagement of the output element 3a, leads to forcing apart the locking elements 4a, 4a' as a result of the force engagement of the output element 3a through the play compensation device 5a and the contact bearing points A, A' and B, B' respectively against the protrusions or curvatures 411a, 411a'; 412a; 412a' of the expanding faces 41a, 41a' of the locking elements 4a, 4a' which leads to an intensification of the bearing force of the clamping faces 42a, 42a', 42a", 42a'" of the locking elements 4a, 4a' against the adjustment housing 10 and thus to a blocking of the torque introduced on the output side.

FIG. 2 shows an adjustment device with a load moment lock 1b and an adjustment housing 10 in which similar to the embodiment described above there is a driver wheel 2b connected to a drive as well as an output element 3b whose claws 31b, 32b engage through window like recesses 21b, 21b' in the driver wheel 2b. Two circular segment shaped locking elements 4b, 4b' bear with their clamping faces 42b, 42b', 42b", 42b'" against the adjustment housing 10. Drive cams 22b, 22b', 22b", 22b'" of the driver wheel 2b engage through semicircular recesses 43b, 43b', 43b", 43b'" of the locking elements 4b, 4b' and rest free of play against the edges of the semicircular recesses.

Between the locking elements 4b, 4b' and the output element 3b is a play compensating device 5b which is forced by means of a spring 7b parallel between the two locking elements 4b, 4b' and causes the recesses 43b, 43b', 43b", 43b'" of the locking elements 4b, 4b', to bear play free against the drive cams 22b, 22b', 22b", 22b'" of the driver wheel 2b. For this purpose the play compensating device 5b has two inclined bearing faces or wedge faces 51b, 51b'; 52b, 52b' with which it rests against cylindrical curvatures 36b, 36b'; 37b, 37b' of the output element 3b.

The spring 7b is mounted between the angled ends 55b, 55b' of the play compensating device 5b and an output claw 32b of the two output claws 31b, 32b of the output element 3b and is designed as a compression spring so that the play compensating device 5b is forced between the cylindrical curvatures 36b, 36b'; 37b, 37b' of the output element 3b and the expanding faces 41b, 41b' of the locking elements 4b, 4b' and thus an elastic contact bearing of the play compensating device 5b is generated against the output element 3b on one side and the locking elements 4b, 4b' on the other. The locking elements 4b, 4b' are moved parallel outwards by the play compensating device 5b so that the clamping faces 42b, 42b'; 42b", 42b'" of the locking elements 4b, 4b' are forced radially against the adjustment housing 10.

The angle between the inclined contact bearing faces or wedge faces 51b, 51b', 52b, 52b' of the play compensating device 5b is selected relative to the axis of symmetry of the output element 3b so that the play compensating device 5b does not yield under stress i.e. is displaced against the action of the spring 7b.

The play compensation between the drive element 2b formed as the driver wheel, the output element 3b and/or the load moment lock 1b takes place similar to the embodiment according to FIG. 1 over large paths of the play compensating device 5b with small paths of the locking elements 4b, 4b'.

Similar to the functioning of the adjustment device of FIG. 1 described above torque introduced on the drive side through the driver wheel 2b on account of the force engagement further away from the centre point and directed circular leads to a slight rotation of the locking elements 4b, 4b' owing to the torque transfer from the drive cams 22b, 22b', 22b", 22b'" of the driver wheel 2b to the recesses 43b, 43b', 43b", 43b'" of the locking elements 4b, 4b' and then after overcoming the distance between the drive cams 22b, 22b', 22b", 22b'" and the recesses 43b, 43b', 43b", 43b'" to a positive connection between the claws 31b, 32b, of the output element 3*b* and the window like recesses 21*b*, 21*b'* of the driver wheel 2*b* and thus to rotation of the output element 3*b*.

Torque introduced on the output side through the output element 3*b* leads on the other hand owing to the more central and radially directed force engagement of the output element 3*b* to the locking elements 4*b*, 4*b'* being forced apart owing to the force engagement of the cylindrical curvatures 36*b*, 36*b'*; 37*b*, 37*b'* of the output element 3*b* against the wedge faces 51*b*, 51*b'*, 52*b*, 52*b'* of the play compensating device 5*b* and further through the rectilinear faces 54*b*, 54*b'*, 54*b''*, 54*b'''* of the play compensating device 5*b* against the expanding faces 41*b*, 41*b'* of the locking elements 4*b*, 4*b'* which leads to intensification of the contact bearing between the clamping faces 42*b*, 42*b'*, 42*b''*, 42*b'''* of the locking elements 5*b*, 5*b'* and the adjustment housing 10 and thus to blocking of the torque introduced on the output side.

The embodiment illustrated in FIG. 3 corresponds to the adjustment device according to FIG. 2 with the measure that the expanding faces 41*c*, 41*c'* of the locking elements 4*c*, 4*c'* have inclined faces 411*c*, 411*c'*, 412*c*, 412*c'* against which corresponding wedge faces 51*c*, 51*c'*; 52*c*, 52*c'* of the play compensating device 5*c* bear. Rectilinear faces 54*c*, 54*c'* of the play compensating device 5*c* bear against the cylindrical curvatures 36*c*, 36*c'*, 37*c*, 37*c'* of the output element 3*c*.

Also in this embodiment between the one output claw 31*c* of the output element 3*c* and the angled ends 55*c*, 55*c'* of the play compensating device 5*c* there is a spring 7*c* formed as a compression spring and producing elastic contact between the wedge faces 51*c*, 51*c'*; 52*c*, 52*c'* of the play compensating device 5*c* and the associated inclined faces 411*c*, 411*c'*, 412*c*, 412*c'* of the locking elements 4*c*, 4*c'*.

All the aforesaid adjustment devices have the basic function in common, namely in the event of drive torque acting in the direction of the output moment the lock established by the locking element is lifted but remains latently active so that an immediate locking action occurs when the drive torque is cancelled. If on the other hand the drive torque acts against the output torque then the lock is lifted and the drive torque is introduced into the output. A slight lifting or circular rotation of the locking element thereby takes place and then an immediate renewed contact bearing against the adjustment housing.

Through the wedge faces of a play compensating device bearing against the output element and/or against the locking elements in conjunction with the pretensioning force of a spring which pretensions the play compensating device perpendicular to the axis of the load moment lock in the sense of reducing the distance between the play compensating device, the output element and the locking elements, the locking element faces are constantly brought in contact bearing against the cylindrical adjustment housing and thus optimum rotational angle play is guaranteed when setting up and even after long service use of the adjustment device.

What is claimed is:

1. An adjustment device for producing a rotational movement, comprising:

a cylindrical adjustment housing;

a drive element;

an output element which is adjustable at an angle by operating the drive element;

a load moment lock mounted between the drive element and the output element which blocks, through force engagement, torque introduced on an output side to a drive side and transfers torque introduced on the drive side to the output element, wherein the load moment lock has locking elements mounted in the cylindrical adjustment housing, the locking elements having clamping faces and opposing faces;

a play compensating device mounted at least in part between the opposing faces of the locking elements which compensates the rotational angle play between the drive element, the output element and the load moment lock and which forces apart the clamping faces with such force that they rest with predetermined pretension against the adjustment housing, wherein the play compensating device for both rotational directions radially forces apart the locking elements mounted in one plane of the load moment lock in a direction perpendicular to an axis of the load moment lock, and wherein the play compensating device has wedge faces which rest against at least one of the output element and the locking elements, and at least one spring which pretensions the play compensating device perpendicular to the axis of the load moment lock in the sense of reducing the distance between the play compensating device, the output element and the locking elements.

2. An adjustment device according to claim 1 wherein the wedge faces include such an angle with an axis of symmetry of the load moment lock that the connection between the play compensating device on one side and the at least one of the output element and the locking elements on the other is self-locking.

3. An adjustment device according to claim 1 or 2 wherein the wedge faces of the play compensating device bear against counter wedge faces of the output element and substantially flat faces of the play compensating device bear against one of opposing faces of the locking elements and parts of the opposing faces.

4. An adjustment device according to claim 1 or 2 wherein the output element has protrusions or curvatures formed symmetrical to the axis of symmetry of the load moment lock for spot or linear contact of substantially rectilinear or inclined faces of the play compensating device.

5. An adjustment device according to claim 4 wherein the wedge faces of the play compensating device bear against the protrusions or curvatures of the output element arranged symmetrical relative to the axis of symmetry of the load moment lock and the substantially rectilinear surfaces of the play compensating device bear against the opposing faces of the locking elements or parts of the opposing faces.

6. An adjustment device according to claim 4 wherein the wedge faces of the play compensating device bear against inclined expanding faces of the locking elements and the substantially rectilinear faces of the play compensating device bear against the protrusions or curvatures of the output element.

7. An adjustment device according to claim 1 wherein the drive element has recesses which with torque on the drive side after lifting the frictional contact of the locking elements against the adjustment housing bear with positive engagement against claws of the output element and entrain same in the drive direction.

\* \* \* \* \*